United States Patent [19]

Prøven

[11] 4,305,384
[45] Dec. 15, 1981

[54] SOLAR PANEL
[75] Inventor: Johan Prøven, Moelv, Norway
[73] Assignee: A/S Moelven Brug, Moelv, Norway
[21] Appl. No.: 94,747
[22] Filed: Nov. 15, 1979
[30] Foreign Application Priority Data Jan. 17, 1979 [NO] Norway .............................. 790160

[51] Int. Cl.³ .............................................. F24J 3/02
[52] U.S. Cl. ................................... 126/443; 126/446; 126/450
[58] Field of Search .............. 126/417, 429, 431, 449, 126/446, 432, 447, 442, 443, 444, 450; 165/49, 53

[56] References Cited

U.S. PATENT DOCUMENTS

| | | | |
|---|---|---|---|
| 3,174,915 | 3/1965 | Edlin | 126/444 |
| 3,859,980 | 1/1975 | Crawford | 126/443 |
| 3,952,725 | 4/1976 | Edmondson | 126/447 |
| 4,059,226 | 11/1977 | Atkinson | 126/429 |
| 4,068,652 | 1/1978 | Worthington | 126/431 |
| 4,069,811 | 1/1978 | Tabor | 126/443 |
| 4,076,013 | 2/1978 | Bette | 126/431 |
| 4,084,574 | 4/1978 | Golay | 126/449 |
| 4,089,326 | 5/1978 | Andrassy | 126/447 |
| 4,141,339 | 2/1979 | Weinstein | 126/449 |
| 4,147,300 | 4/1979 | Milburn | 126/429 |
| 4,171,694 | 10/1979 | Parker | 126/450 |
| 4,178,912 | 12/1979 | Felter | 126/431 |
| 4,184,476 | 1/1980 | McArthur | 126/431 |
| 4,185,616 | 1/1980 | Johnson | 126/443 |
| 4,186,723 | 2/1980 | Coppola et al. | 126/443 |
| 4,201,196 | 5/1980 | Zani | 126/450 |
| 4,212,292 | 7/1980 | Reinert | 126/429 |

OTHER PUBLICATIONS

Miller, A Self Powered Solar Heat Pipe, Mechanix Illustrated, p. 31, Dec. 1978.

Primary Examiner—Daniel J. O'Connor
Attorney, Agent, or Firm—Holman & Stern

[57] ABSTRACT

A solar panel, comprising a closed body of thermal insulation material with a transparent surface on at least one side thereof, the body having one or more countersunk sections which are lower than the side edges and optional support members, and is surrounded by a transparent sleeve such that one or more air spaces are formed between said sleeve and said lowered sections, the body and the sleeve together constituting an element which is adapted to be installed between structural members in a building or itself constituting an independent wall/roof member.

2 Claims, 5 Drawing Figures

SOLAR PANEL

BRIEF SUMMARY OF THE INVENTION

The present invention pertains to solar panels which are used to collect solar energy, which is transferred to a storage means or an accumulator from which energy for consumption, for example, for heating, can later be drawn as needed.

The previously known solar panels have been built up of a number of different materials in order to obtain a satisfactory functioning of the device. Such solar panels might comprise a frame or a cassette, usually of aluminum, lined with a thermal insulation material; an absorber surface, usually of metal, from which the heat energy is transferred to a heat-carrying medium which can be a liquid or air; and one or more transparent materials which form the exterior of the frame or cassette; then with the aid of sealing materials and clamp-fit moldings, one seals the panel against the outside climate. A suitable number of such solar panels are usually attached to a roof structure, a sloping wall or the like, positioned such that rays from the sun strike at the most profitable angle of incidence.

A substantial disadvantage with the previously known solar panels is that they are of a complicated construction and are therefore expensive to produce, such that the panels constitute a very substantial proportion of the costs of a solar heating system, for example, for a home.

The object of the present invention, therefore, is to arrive at a solar panel which is far simpler and less expensive to produce, but without adversely affecting the functioning of the panel.

In accordance with the invention, this object is obtained in that the solar panel comprises a hollow space sandwiched between a transparent surface and a layer of insulating material, which can well be the same type of insulating material as one in any case would have to use as thermal insulation in the roof or wall in which the solar panel is installed.

BRIEF DESCRIPTION OF THE SEVERAL VIEWS OF THE DRAWINGS

The invention is characterized by the features recited in the appurtenent patent claims, and will be further elucidated in the following with reference to the accompanying drawings, where

DETAILED DESCRIPTION

Figure 1:
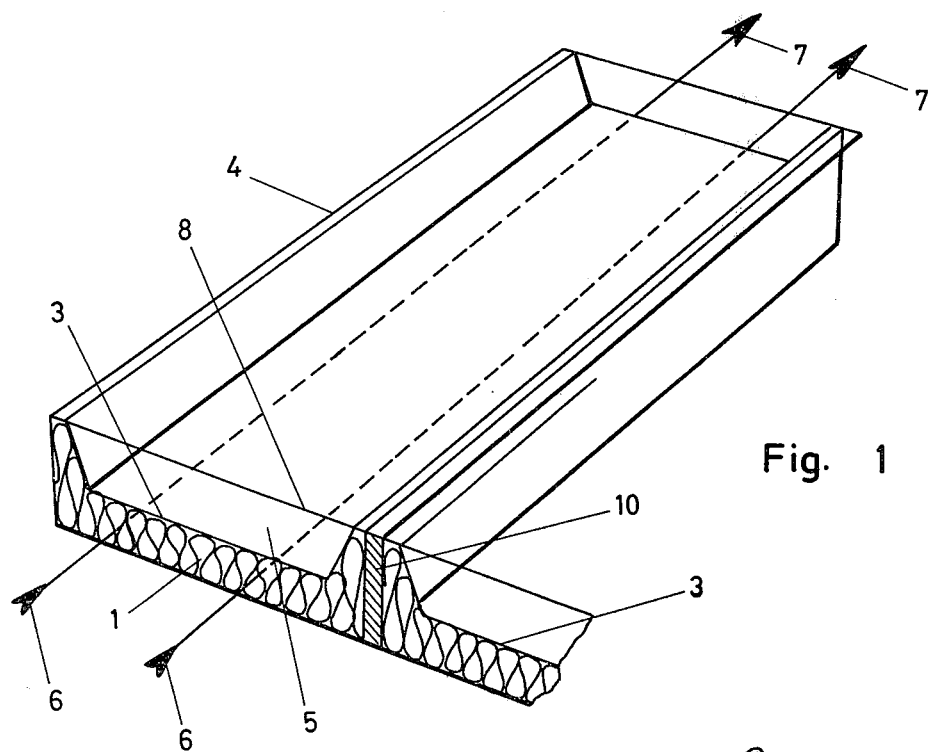
FIG. 1 shows, in perspective, an embodiment of a solar panel utilizing air as the heat-carrying medium, FIG. 2 also in perspective, shows an embodiment adapted to utilize liquid as the heat-carrying medium.

As shown in FIG. 1, the solar panel comprises a body 1 of thermal insulation material, optionally partitioned by a mechanical support member and provided with a transparent foil 2 on at least one of the side surfaces thereof. The foil can be of a tubular configuration and thus surround the body of insulation material on all sides. In accordance with the invention, the body 1 has one or more sections 3 which are at a lower level than the side edges 4 and optional support members 10 (partitioning members), and a hollow space 5 is thus formed between the foil 2 and the sections 3; as the sun shines through the foil, the temperature inside the space 5 will increase as the sun's rays heat up the insulation material in the section 3, which in this way forms an absorber. The insulation material used is of a type which permits air to flow through it in the longitudinal direction of the solar panel, as shown by the arrows 6 and 7, where the arrows 6 indicate an inflow of cold air and the arrows 7 the outflow of air which has been heated by its passage over the insulation material in the body 1, which in turn has been heated by the rays of the sun. The foil and insulating body together provide adequate mechanical strength, and such solar panels can be placed between rafters, between beams, or between studs in the wall in the same way as one today installs insulation matting for heat insulation.

Figure 5:
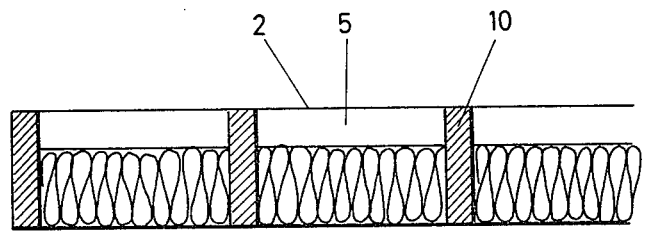
FIG. 5 shows an embodiment in which a plurality of support members have been provided.

With reference to FIG. 5, one may also install structural support members 10 in the elements, such that the elements thus constitute integral, self-supporting roof/wall members. The exterior covering for the building structure, which provides protection against wind and rain, must then be made of a transparent material. In this way, the solar panels are integrated into the structure per se of the building. In order to increase the efficiency of the body 1 even more, it can be painted black or be coated with a material which has a higher degree of absorption than the insulation material.

The example illustrated in FIG. 1 is adapted to utilize air as the heat-carrying medium, but the solar panels of the invention can also be adapted to solar heating systems utilizing liquid as the heat-carrying medium. An example of this is shown in FIG. 2, where a serpentine tube 8 is installed in the solar panel, the bends of the tube being in good heat-transferring contact with the insulating body 1, for example, being placed on one surface of the body or being embedded in the insulation material.

Figure 2:
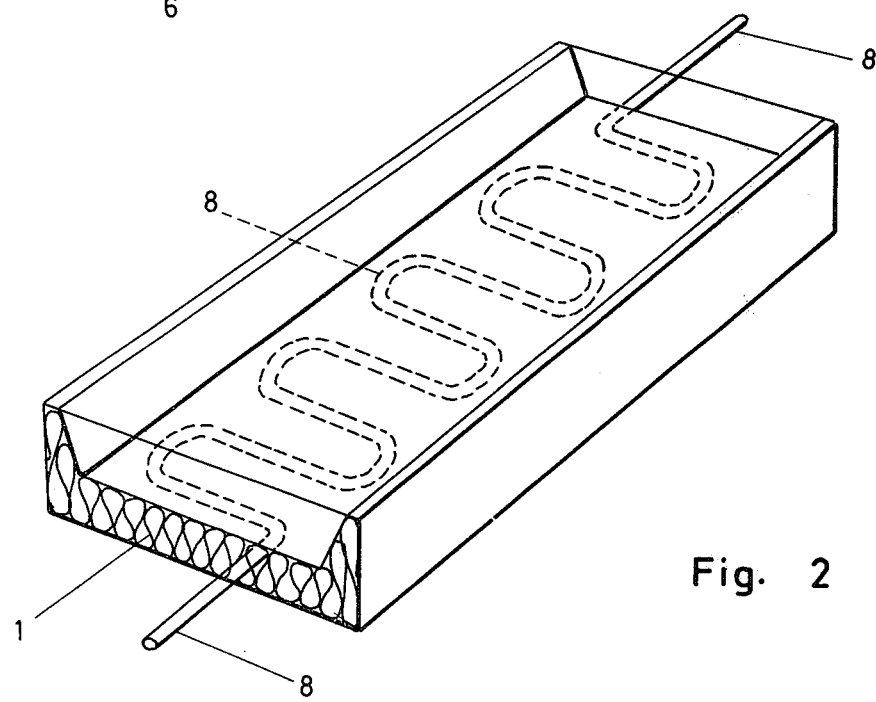
Figure 3:
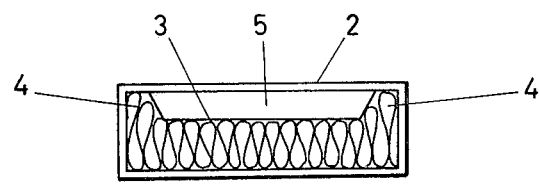
FIGS. 3 and 4 show respective end views of two possible embodiments of the solar panel.
Figure 4:
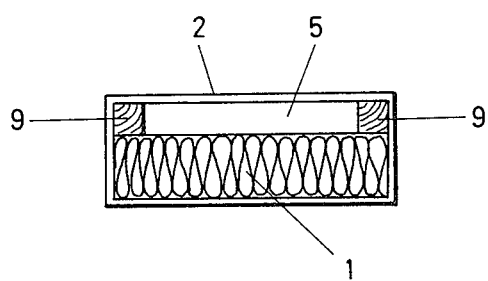

As explained above, the main parts of the solar panel, i.e., the body 1 of insulation material and the surrounding transparent foil, are both inexpensive, easily available building materials which one must in any case utilize, and in the embodiment shown in FIG. 3 the insulating body 1 is formed with raised edges 4 and shown on FIG. 2, thereby providing an air space 5 between the top surface of the lower section 3 and the foil 2, which in a tubular form 1 surrounds the solar panel. Another solution is to utilize an insulation matting with plane side surfaces as the insulating body 1 (FIG. 4). Spacer boards 9 are then laid along the edges on one surface of the insulation to hold the transparent foil 2 a sufficient distance from the surface of the body 1 to provide the air space 5.

The examples illustrated herein serve merely to illustrate the invention and should not be construed as constituting a limitation on the scope of protection provided by this patent, as other embodiments can easily be imagined which would fall within the scope of the invention.

Having described my invention, I claim:

1. A modular solar panel comprising a generally elongated body of porous thermal insulation material, said pores providing for free flow of air through said body in substantially the longitudinal direction, at least one continuous channel in one surface of said body extending in the longitudinal direction the full length of said body, said channel forming upstanding side walls extending along the longitudinal sides of said body, which in cross-section have an inner surface sloping toward the center of the said body so that said side walls are thicker at the bottom than at the top to provide greater structural strength at said bottom, said channel being completely plain and containing no elements therein so that the surface thereof extending between the side walls provides a maximum exposed area for absorption of the solar rays, at least one serpentine tube for the flow of liquid therethrough as a heat-carrying medium extending through said body of insulation material in substantially the longitudinal direction underlying said surface of said channel between the side walls so that heat received on said surface is conveyed to said liquid in said tube, and a tubular foil of transparent plastic material surrounding said body to enclose said channel leaving the ends of said body and channel open to allow free flow of air therethrough, said body and tubular foil providing a modular unit a plurality of which are installed in a building in the spaces between structural members so that the outer surfaces of the side walls of the modular units engage the side surfaces of said structural members with said tubular foil therebetween.

2. A modular solar panel as claimed in claim 1 wherein at least said surface of the channel between said side walls is colored black to provide high heat absorption on said surface.

* * * * *